J. A. UHLS.
ANIMAL TRAP.
APPLICATION FILED MAY 6, 1916.

1,244,563.

Patented Oct. 30, 1917.

John A. Uhls
Inventor

By Geo. P. Kimmel.
Attorney

UNITED STATES PATENT OFFICE.

JOHN A. UHLS, OF SALMONS, KENTUCKY.

ANIMAL-TRAP.

1,244,563.　　　　　Specification of Letters Patent.　　Patented Oct. 30, 1917.

Application filed May 6, 1916. Serial No. 95,927.

*To all whom it may concern:*

Be it known that I, JOHN A. UHLS, a citizen of the United States, residing in Salmons, in the county of Simpson and State of Kentucky, have invented certain new and useful Improvements in Animal-Traps, of which the following is a specification.

The present invention relates to new and useful improvements in jaw traps and more particularly to traps of this class which may be inserted in the excavation formed by moles and other earth boring animals.

The invention has for its primary object the provision of an improved trap structure facilitating its disposition within the tunnel or other excavation which moles and other animals form whereby to capture the animal as it passes through the excavation.

Figure 1:
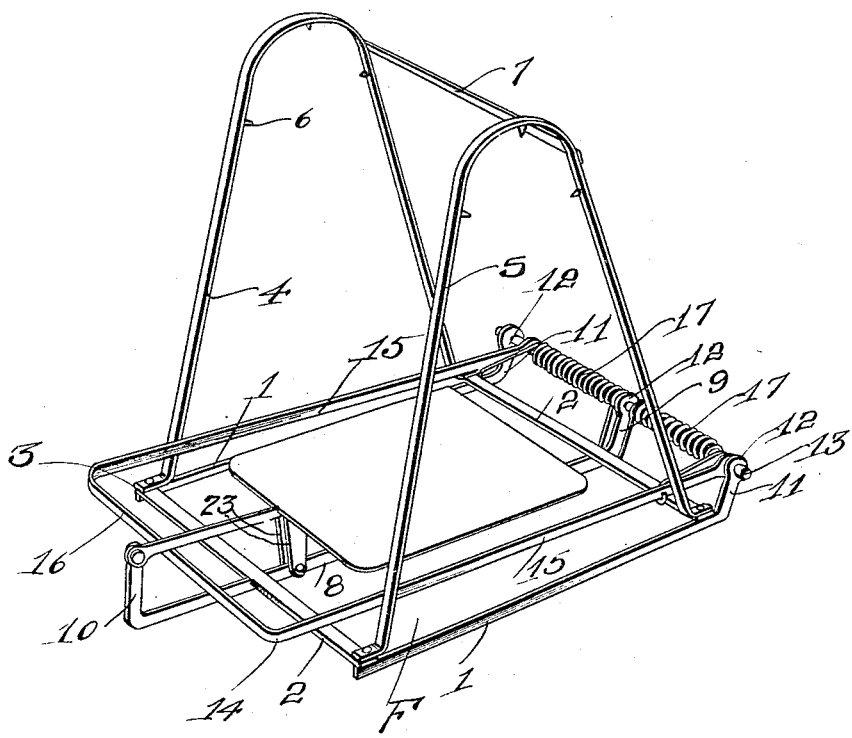
Figure 2:
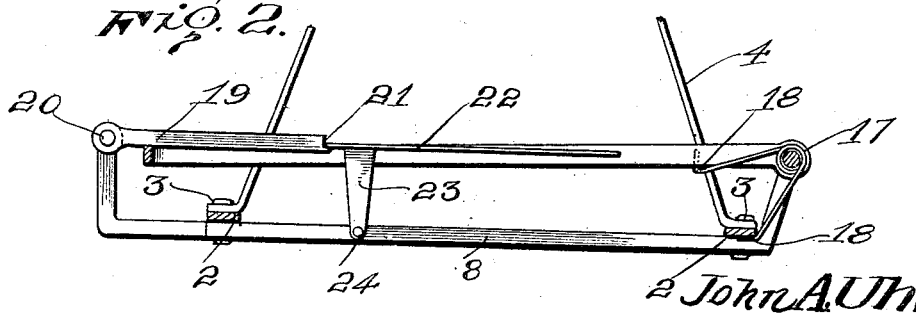

Other objects and advantages to be derived from the use of my improved trap will appear from the following detail description and the claim, taken with an inspection of the accompanying drawing, in which:

Figure 1 is a perspective view of a trap embodying the improvements of my invention; and Fig. 2 is a fragmental transverse sectional view showing the setting structure enlarged.

Referring more particularly to the drawing, wherein similar characters of reference designate like and corresponding parts throughout the various views, my improved trap includes a base frame F comprising side bars 1 and end bars 2. Said side and end bars are connected as at 3 and serve to support the stationary jaws 4 and 5 of the trap, said jaws being substantially U-shaped in configuration and provided with prongs 6 on their inner surfaces, said jaws being braced by a bar 7.

A strengthening bar 8 located centrally of the frame F extends longitudinally thereof and is provided with upturned ends 9 and 10. The side bars 1 are provided with upturned ends 11 in alinement with the upturned end 9 of the bar 8, all of said upturned ends being provided with bearings 12 adapted to receive a shaft 13 which carries a pivoted movable jaw of my trap.

The movable jaw of my trap includes a U-shaped member 14 the side arms 15 of which are pivoted on the shaft 13. The transverse portion of the jaw is designated 16 and serves the purpose which will hereinafter appear. A pair of coil springs 17 are wound about the shaft 13 and have their free ends 18 engaging respectively, side arms 15 of the jaw 14 and the end bars 2.

The setting means of my improved trap includes an arm 19 pivoted at 20. The upturned portion 10 of the bar 8 having the free extremity thereof provided with a notch 21 in engagement with one marginal edge of the tripping platform 22, said tripping platform having spaced arms 23 carried thereby and arranged for pivotal engagement as at 24 with said bar 8.

In use, the trap is placed transversely within the bore or tunnel in the mouth thereof or at any accessible point in the tunnel. The trap is then set as shown in Figs. 1 and 2 and when an animal steps upon the platform 22 the arm 19 is released permitting the removable jaw to swing upwardly catching the animal between said jaw and the stationary jaws.

It will be seen that I have provided in a simple and strong structure an effective animal trap which may be quickly and easily arranged in position for use, and which may be set with very little difficulty.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

In a device of the character described, the combination of a supporting frame including a pair of side and end bars, U-shaped stationary jaws, the side and end bars and the U-shaped jaws being secured together, a strengthening bar comparatively longer than the side bars, the strengthening bar and the side bars being provided with an upturned end portion, bearings provided in the upturned portions, a shaft mounted in said bearings, the free end of the strengthening bar being upturned, a tripping platform, a pair of spaced arms carried by the platform pivotally mounted on the strengthening bar, a movable U-shaped jaw pivotally connected to the shaft, means associated with the shaft and movable jaw member to normally retain the same in raised position, and means associated with the platform and the free end of the strengthening bar to retain the movable jaw under tension in a lowered position for a purpose specified.

In testimony whereof, I affix my signature hereto.

JOHN A. UHLS.